(12) United States Patent
Hirose et al.

(10) Patent No.: US 8,102,425 B2
(45) Date of Patent: Jan. 24, 2012

(54) ELECTRONIC CAMERA AND IMAGE TRANSFER METHOD ADOPTED IN ELECTRONIC CAMERA

(75) Inventors: Keiichi Hirose, Tokyo (JP); Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 283 days.

(21) Appl. No.: 12/310,316

(22) PCT Filed: Aug. 22, 2007

(86) PCT No.: PCT/JP2007/066299
§ 371 (c)(1),
(2), (4) Date: Feb. 20, 2009

(87) PCT Pub. No.: WO2008/023742
PCT Pub. Date: Feb. 28, 2008

(65) Prior Publication Data
US 2009/0195662 A1    Aug. 6, 2009

(30) Foreign Application Priority Data

Aug. 23, 2006   (JP) .................. 2006-226597

(51) Int. Cl.
    *H04N 5/225* (2006.01)
(52) U.S. Cl. ............... 348/207.1; 348/211.1; 348/231.2; 348/231.99
(58) Field of Classification Search ............... 348/207.1, 348/231.1–231.3, 211.1–211.8, 231.99
See application file for complete search history.

(56) References Cited

U.S. PATENT DOCUMENTS

| | | | |
|---|---|---|---|
| 6,188,431 B1 * | 2/2001 | Oie ............... | 348/211.5 |
| 7,062,230 B1 | 6/2006 | Ishiguro et al. | |
| 7,265,780 B2 * | 9/2007 | Tanaka et al. ........... | 348/207.99 |
| 2004/0189809 A1 * | 9/2004 | Choi ............ | 348/207.1 |
| 2005/0206749 A1 * | 9/2005 | Miyazaki ................ | 348/231.99 |
| 2005/0285962 A1 * | 12/2005 | Cornejo .................. | 348/333.01 |
| 2006/0142059 A1 | 6/2006 | Ishiguro et al. | |

FOREIGN PATENT DOCUMENTS

| | | |
|---|---|---|
| JP | A-2000-175092 | 6/2000 |
| JP | A-2001-45178 | 2/2001 |
| JP | A-2001-69296 | 3/2001 |
| JP | A-2001-111884 | 4/2001 |
| JP | A-2001-309219 | 11/2001 |
| JP | A-2004-336196 | 11/2004 |

* cited by examiner

*Primary Examiner* — Tuan Ho
*Assistant Examiner* — Kent Wang
(74) *Attorney, Agent, or Firm* — Oliff & Berridge, PLC (57) ABSTRACT

An electronic camera includes: a communication unit engaged in communication with an external device; a selection unit that selects a transfer method of a photographic image; a transfer control unit that controls the communication unit so as to start, in response to a command transmission from the communication unit to the external device, a transfer of the photographic image from the communication unit to the external device through the transfer method selected by the selection unit; a registration unit where information related to the photographic image to be transferred is registered; and a registration control unit that adjusts a registration method with which the information is registered in the registration unit in correspondence to the transfer method selected by the selection unit.

15 Claims, 6 Drawing Sheets

ELECTRONIC CAMERA AND IMAGE TRANSFER METHOD ADOPTED IN ELECTRONIC CAMERA

TECHNICAL FIELD

The present invention relates to an electronic camera and an image transfer method that may be adopted in an electronic camera.

BACKGROUND ART

An electronic camera known in the related art wirelessly transfers an image file containing a photographic image to an external device in conformance to a specific communication protocol (see patent reference 1).
Patent reference 1: Japanese Laid Open Patent Publication No. 2001-111884

DISCLOSURE OF THE INVENTION

Problems to be Solved by the Invention

A specific registration area, where management information used to manage image files to be transferred to the external device is registered, is normally allocated in memory. Since only a limited registration area can be allocated in memory, the volume of management information that can be registered in the registration area is also limited. Thus arises a concern that when a large number of image files containing photographic images have been created (when a large number of images are recorded within the electronic camera) transfer target image files may no longer be managed effectively.

Means for Solving the Problems

According to the 1st aspect of the present invention, an electronic camera comprises: a communication unit engaged in communication with an external device; a selection unit that selects a transfer method of a photographic image; a transfer control unit that controls the communication unit so as to start, in response to a command transmission from the communication unit to the external device, a transfer of the photographic image from the communication unit to the external device through the transfer method selected by the selection unit; a registration unit where information related to the photographic image to be transferred is registered; and a registration control unit that adjusts a registration method with which the information is registered in the registration unit in correspondence to the transfer method selected by the selection unit.

According to the 2nd aspect of the present invention, in the electronic camera according to the 1st aspect, it is preferred that if a transfer method where by photographic images that have not been previously transferred are transferred to the external device, is selected by the selection unit, the registration control unit records information related to all photographic images recorded in a recording medium loaded in the electronic camera into the registration unit.

According to the 3rd aspect of the present invention, in the electronic camera according to the 2nd aspect, it is preferred that if a volume of information to be registered exceeds a volume of information that can be registered at once in the registration unit, the registration control unit registers the information to be registered into the registration unit in a plurality of installments.

According to the 4th aspect of the present invention, in the electronic camera according to the 1st aspect, it is preferred that if a transfer method where by photographic images satisfying a specific condition are transferred is selected by the selection unit, the registration control unit registers information related to photographic images satisfying the specific condition among photographic images recorded in a recording medium loaded in the electronic camera, into the registration unit.

According to the 5th aspect of the present invention, in the electronic camera according to the 4th aspect, it is preferred that if a volume of information to be registered exceeds a volume of information that can be registered at once in the registration unit, the registration control unit registers the information to be registered into the registration unit in a plurality of installments.

According to the 6th aspect of the present invention, in the electronic camera according to the 3rd or 5th aspect, it is preferred that: the transfer control unit controls the communication unit so as to transfer photographic images corresponding to the information having been registered in the registration unit; and after the photographic images corresponding to the information initially registered in the registration unit are transferred, the registration control unit registers information that has not yet been registered into the registration unit.

According to the 7th aspect of the present invention, in the electronic camera according to the 1st aspect, it is preferred that if a transfer method whereby a photographic image resulting from a photographing operation is transferred after each photographing operation is selected by the selection unit, the registration control unit does not register information related to photographic images already recorded in a recording medium loaded in the electronic camera into the registration unit.

According to the 8th aspect of the present invention, in the electronic camera according to the 7th aspect, it is preferred that each time a newly photographic image is recorded into the recording medium, the registration control unit additionally registers information related to the newly photographic image into the registration unit.

According to the 9th aspect of the present invention, in the electronic camera according to the 8th aspect, it is preferred that the transfer control unit controls the communication unit so as to transfer a photographic image corresponding to the information having been additionally registered into the registration unit.

According to the 10th aspect of the present invention, in the electronic camera according to the 1st aspect, it is preferred that: if a transfer method whereby photographic images that have not previously been transferred are transferred to the external device is selected by the selection unit, the registration control unit registers information related to all photographic images recorded in a recording medium loaded in the electronic camera into the registration unit; and if a transfer method whereby a photographic image resulting from a photographing operation is transferred following each photographing operation is selected by the selection unit, the registration control unit additionally registers information related to a newly photographic image into the registration unit each time the newly photographic image is recorded into the recording medium, without registering information related to photographic images already recorded in the recording medium loaded in the electronic camera.

According to the 11th aspect of the present invention, in the electronic camera according to anyone of the 1st through 10th aspects, it is preferred that the transfer control unit transmits to the external device information related to a photographic image having been registered in the registration unit and executes control so as to transfer the photographic image in response to a request issued from the external device based upon the information related to the photographic image, which has been registered in the registration unit and transmitted to the external device.

According to the 12th aspect of the present invention, an image transfer method adopted in an electronic camera comprises: selecting a transfer method through which a photographic image is to be transferred to an external device; registering information related to the photographic image into a predetermined storage area through a method adjusted in correspondence to the selected transfer method; transmitting the information related to the photographic image, having been registered into the predetermined storage area, to the external device; and transferring the photographic image to the external device in response to a request issued from the external device based upon the information related to the photographic image having been transmitted to the external device.

According to the 13th aspect of the present invention, in the image transfer method adopted in an electronic camera according to the 12th aspect, it is preferred that: the photographic image is recorded into a recording medium loaded into the electronic camera; if a first transfer method is selected, information related to all images recorded in the recording medium is registered into the predetermined storage area; and if a second transfer method different from the first transfer method is selected, information related to an image newly recorded into the recording medium is registered into the predetermined storage area without registering the information related to the images already recorded in the recording medium into the predetermined storage area.

ADVANTAGEOUS EFFECT OF THE INVENTION

The electronic camera according to the present invention is capable of managing the information on image files to be transferred to the external device in an optimal manner even when a very large number of images are recorded therein.

BRIEF DESCRIPTION OF THE DRAWINGS

FIG. 1 A block diagram of the electronic camera achieved in an embodiment of the present invention FIG. 2 An example of a menu screen that may be brought up on display to allow the user to set the transfer method FIG. 3 An example of a sequence of processing that may be executed to transfer image files through the "easy transfer" method FIG. 4 A flowchart of the transfer processing executed by the main CPU FIG. 5 An example of a sequence of processing that may be executed to transfer image files through the "shoot & transfer" method FIG. 6 A flowchart of the transfer processing executed by the main CPU

BEST MODE FOR CARRYING OUT THE INVENTION

Figure 1:
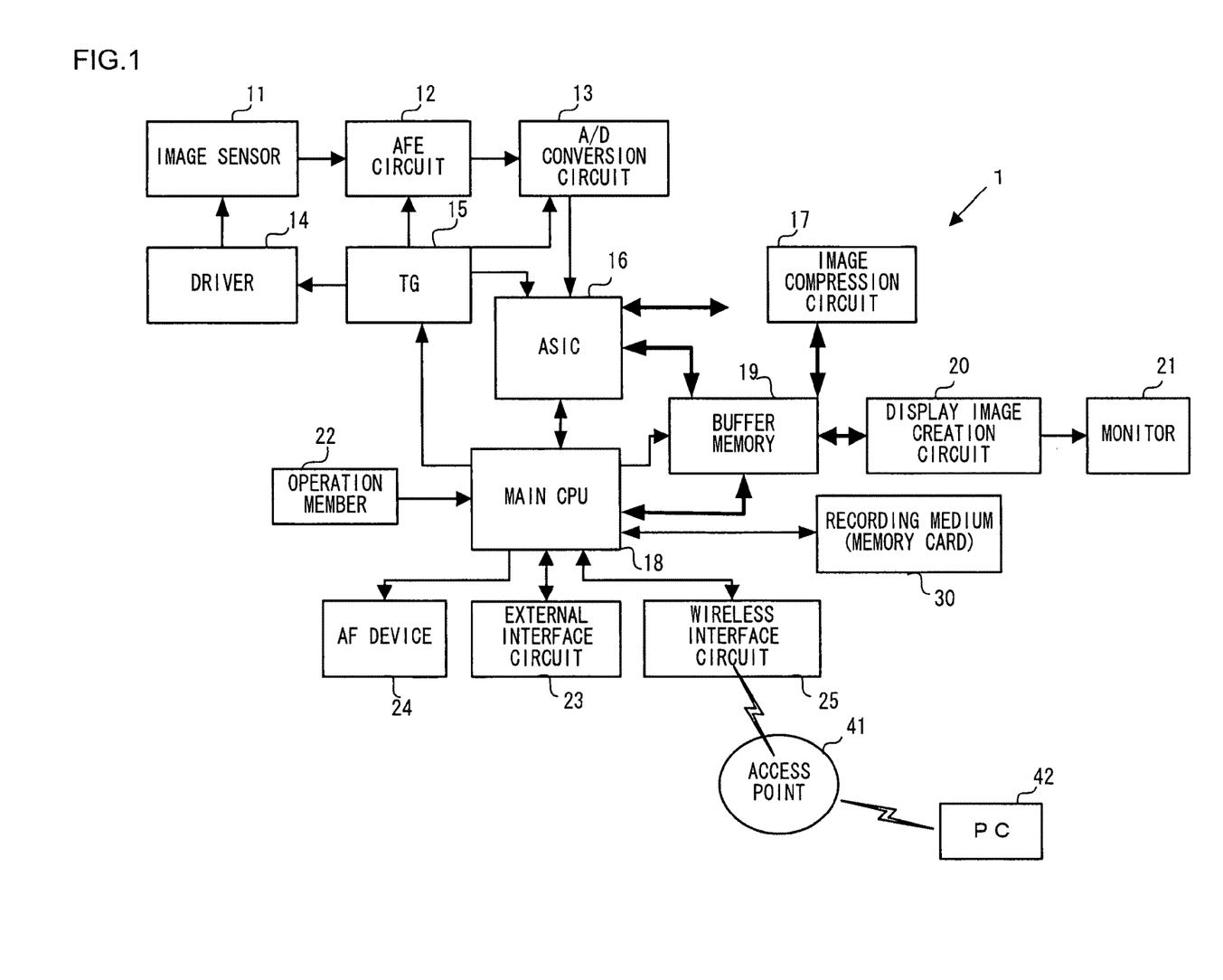

The following is a description of the best mode for carrying out the present invention, given in reference to the drawings. FIG. 1 is a block diagram of an electronic camera 1 achieved in an embodiment of the present invention. Either a photographing mode or a reproduction mode may be selected freely in the electronic camera 1. The photographing mode is an operation mode selected to photograph a subject image and save the image data obtained by photographing the subject image as an image file into a recording medium 30 such as a memory card. A still image file is saved through a still image shooting operation, whereas a movie image file is saved through a movie shooting operation. The reproduction mode is an operation mode selected to display at a liquid crystal monitor 21 a reproduced image expressed with image data in an image data file containing a previously photographic image, which may be read out from the recording medium 30.

A timing generator (TG) 15 in FIG. 1 provides a signal to a driver 14, an AFE (analog front end) circuit 12 and an A/D conversion circuit 13 in response to an instruction output from a main CPU 18. The driver 14 provides a drive signal required at an image sensor 11. The AFE circuit 12 executes analog processing (such as gain control) on signals having undergone photoelectric conversion and output from the image sensor 11. The A/D conversion circuit 13 converts the image signals having undergone analog processing to digital signals.

A main CPU 18 executes specific arithmetic operations by using signals input thereto from various blocks and outputs control signals generated based upon the arithmetic operation results to the individual blocks. An image processing circuit 16, which may be constituted with, for instance, an ASIC, executes image processing on the digital image signals input thereto from the A/D conversion circuit 13. The image processing executed at the image processing circuit may include edge emphasis processing, color temperature adjustment (white balance adjustment) processing and format conversion processing executed to reformat the image signal.

An image compression circuit 17 executes image compression processing through the JPEG method at a predetermined compression rate on the image signals having undergone the processing at the image processing circuit 16. A display image creation circuit 20 creates display data to be used to display the captured image at the liquid crystal monitor 21.

The recording medium 30 may be constituted with a detachable memory card or the like, which can be loaded into/unloaded from the electronic camera 1. In response to an instruction issued from the main CPU 18, an image file containing photographic image data and information related to the photographic image is recorded into the recording medium 30. The image file having been recorded into the recording medium 30 can be read out in response to an instruction issued by the main CPU 18.

A buffer memory 19 is used to store an image file that is to be recorded into the recording medium 30 and store an image file having been read out from the recording medium 30 in addition to temporarily store data to undergo the image processing, data having undergone the image processing and data currently undergoing the image processing.

An operation member 22, which corresponds to operation buttons at the electronic camera 1, outputs operation signals corresponding to depressions of the individual buttons to the main CPU 18. An AF device 24 detects the focusing condition of the photographic lens (not shown) in response to an instruction output from the main CPU 18 and executes focus adjustment by driving the focus lens forward/backward along the optical axis based upon the detection results.

An external interface circuit 23 adopts a structure that allows it to establish a wired connection with an external device (e.g., a personal computer PC). In response to an instruction from the main CPU 108, the external interface circuit 23 engages in communication with a connected external device in conformance to a specific communication protocol. The electronic camera 1 in the communication-enabled state is able to exchange data and information in image files with the external device through the wired communication.

A wireless interface circuit 25 engages in wireless communication with an external device (e.g., a terminal at an access point 41) through a wireless LAN communication method (e.g., IEEE 802.11b or IEEE 802.11g) in response to an instruction from the main CPU 108. The wireless communication executed by the wireless interface circuit may be in compliance with the WiFi (wireless fidelity) standard, which is an international standard specifications for assuring compatibility among various wireless LAN devices.

The structure adopted in the access point 41 allows it to function as a relay point via which data transmitted from the wireless interface circuit 25 in the electronic camera 1 are transmitted to a PC 42 and data transmitted from the PC 42 are transmitted to the electronic camera 1. Via the access point 41, the electronic camera 1 and the PC 42 are able to engage in wireless communication. The electronic camera 1 wirelessly connected with the PC 42 is able to exchange data and information contained in image files. The wireless communication is executed in conformance to the PTPIP (picture transfer protocol over Internet protocol) in the known art.

In the following description of an example of communication between the electronic camera 1 and an external device, the electronic camera 1 transfers photographic image files to the PC 42 via a wireless LAN. As an operation signal indicating "wireless LAN" is input from a mode dial (not shown) constituting part of the operation member 22 to the main CPU 18, the electronic camera 1 shifts into a wireless LAN mode.

Data referred to as a profile, containing information needed to connect with the PC 42 via the wireless LAN, are preregistered in the electronic camera 1. The profile is stored in a non-volatile memory (not shown) within the main CPU 18. By controlling the wireless interface circuit 25 based upon the contents of the profile, the electronic camera 1 executes connection processing to establish a wireless LAN connection between the electronic camera 1 and the PC 42.

Before establishing the wireless LAN connection, a specific image file transfer method is selected in the electronic camera 1. The available transfer methods include at least the following three methods, i.e., "easy transfer", "photographing date transfer" and "shoot & transfer". The electronic camera 1 brings up a transfer method setting menu screen such as that shown in FIG. 2 on display at the liquid crystal monitor 21 and selects the transfer method corresponding to an operation signal provided from the operation member 22.

Transfer Through Easy Transfer Method

In response to an operation signal from the operation member 22 indicating "easy transfer", the electronic camera 1 selects the "easy transfer" method. In the "easy transfer" method, image files recorded in storage (the recording medium 30 in this example) within the electronic camera 1 are compared with the image files recorded in a storage area at the PC 42 and only image files that are not yet recorded at the PC 42 are transferred to the PC 42. As a result, image files that have not been previously transferred to the PC 42 alone are selectively transferred. In the "easy transfer" method, list information listing the image files recorded in the electronic camera 1 is transmitted to the PC 42 prior to the image file transfer so as to enable the PC 42 to determine the disparity between the image files recorded in the electronic camera 1 and the image files recorded at the PC 42. The PC 42 then issues a request to the electronic camera 1 to transfer the image files that correspond to the disparity.

Figure 3:
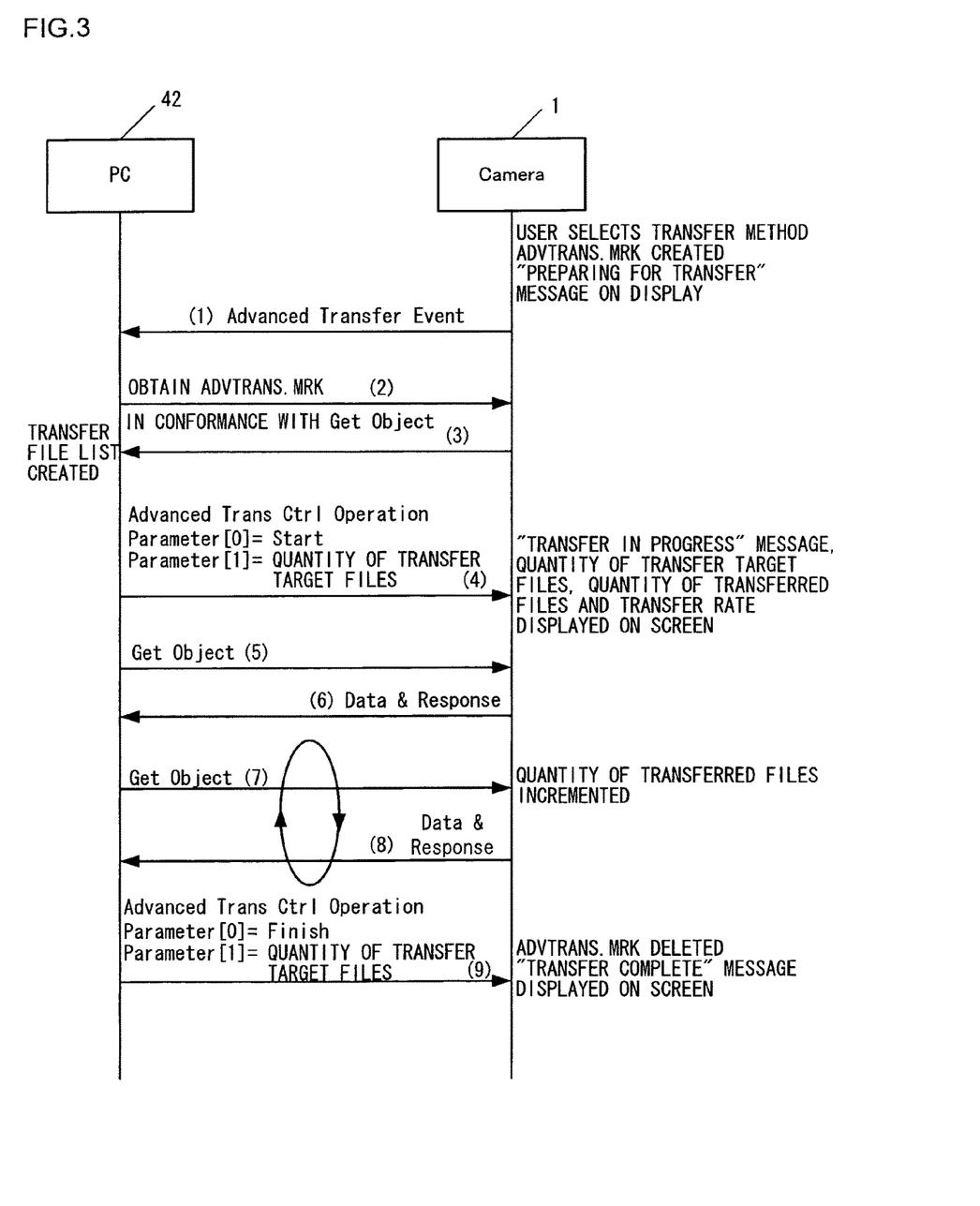

FIG. 3 presents an example of a processing sequence that may be executed when transferring image files from the electronic camera 1 to the PC 42 through the "easy transfer" method. As the "easy transfer" method is selected, the electronic camera 1 brings up a message "preparing for transfer" at the liquid crystal monitor 21 and creates a command file "ADVTRANS.MRK" for the "easy transfer" method. The electronic camera 1 then transmits to the PC 42 an Advance Transfer Event command (1), so as to notify the PC 42 that a command file has been created. Upon receiving the Advance Transfer Event command, the PC 42 transmits a Get Object command requesting that the electronic camera 1 transmits the command file to the electronic camera 1 (2). In response to the request, the electronic camera 1 transmits to the PC 42 a command file "ADVTRANS.MRK" (3). The PC 42 thus obtains the command file.

Based upon the command file having been obtained, the PC 42 creates a list of image files to be transferred. Once the image file list is created, the PC 42 transmits through an Advanced Transfer Ctrl Operation command indicating the quantity of image files to be transferred to the electronic camera 1 (4). At this time, the electronic camera 1 brings up on display at the liquid crystal monitor 21 a message "transfer in progress", the quantity of image files yet to be transferred, the quantity of image files having been transferred and the transfer rate. The transfer rate, represented by the average of the transfer rates over the immediately preceding 10 seconds, is calculated each second.

Subsequently, the PC 42 transmits to the electronic camera 1 a Get Object command (5) and requests that the electronic camera 1 transmits a first image file. Upon receiving the request, the electronic camera 1 returns a response accompanied by the corresponding image file, to the PC 42 in conformance to a Data & amp; Response command (6). Next, the PC 42 transmits to the electronic camera 1 a Get Object command (7) and requests that the electronic camera 1 transfers the next image file. Upon receiving the request, the electronic camera 1 returns a response accompanied by the corresponding image file, to the PC 42 in conformance to a Data & amp; Response command (8).

As the processing in (7) and (8) is repeatedly executed, image files specified by the PC 42 are sequentially transferred from the electronic camera 1 to the PC 42. It is to be noted that during this process, the electronic camera 1 increments the quantity of image files indicated at the liquid crystal monitor 21 in correspondence to the quantity of image files having been transferred to the PC 42.

Once all the image files have been transferred, the PC 42 transmits to the electronic camera 1 an Advanced Transfer Ctrl Operation command (9) thereby notifying the electronic camera 1 that the transfer is complete. In response, the electronic camera 1 deletes the command file "ADVTRANS-.MRK" and brings up on display at the liquid crystal monitor 21 a "transfer complete" message. Through the processing sequence described above, the image files corresponding to the "disparity between the image files" described earlier are selectively transferred from the electronic camera 1 to the PC 42.

Figure 4:
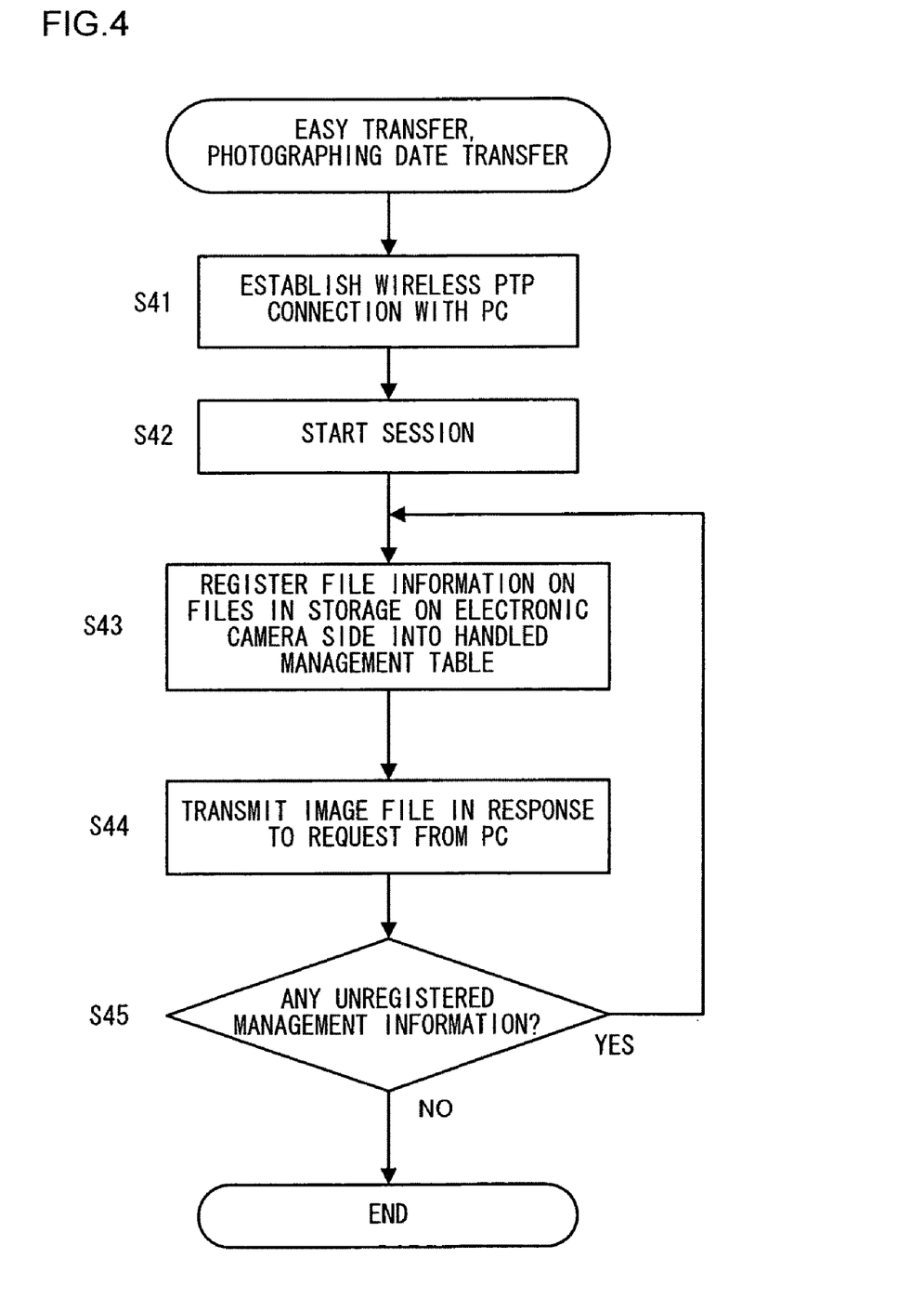

In reference to the flowchart presented in FIG. 4, the flow of transfer processing executed by the main CPU 18 in the electronic camera 1 during the processing sequence, an example of which is presented in FIG. 3, is described. The program based upon which the processing in FIG. 4 is executed is started up as an operation signal indicating "easy transfer" is input from the operation member 22 to the main CPU 18. In step S41 in FIG. 4, the main CPU establishes a wireless PTP connection with the PC 42 and then the operation proceeds to step S42.

In step S42, the main CPU 18 starts a session before the operation proceeds to step S43. In step S43, the main CPU 18 registers information indicating all the image files recorded in the storage (the recording medium 30 in the example) loaded in the electronic camera 1 into a handle management table.

The handle management table is a management information recording area that is a specific area allocated in advance in the memory (not shown) in the main CPU 18. In order to transfer image files to an external device in conformance to the PTP protocol mentioned earlier, the main CPU 18 records image file management information into the handle management table. The main CPU 18 in the embodiment first initializes the contents of the handle management table (i.e., clears the register contents in the handle management table) and then writes information indicating the image files recorded in the recording medium 30 into the handle management table.

If the data volume of the management information to be registered corresponding to all the image files stored in the recording medium 30 exceeds the recording capacity in the area allocated for the handle management table, management information for the quantity A of image files that can be registered at once is written into the handle management table before the operation proceeds to step S44. The registration of excess management information, i.e. the management information for the (A+1)th image file and beyond, that is not registered at this time, is to be described in detail later.

The main CPU 18 also creates the command file "ADVTRANS.MRK" described earlier based upon the details of the registered information in the handle management table and transmits the command file to the PC 42 (corresponds to (3) in FIG. 3) before the operation proceeds to step S44. Namely, the details of the registered information in the handle management table are transmitted to the PC 42 as list information indicating the list of image files recorded in the recording medium 30.

In step S44, the main CPU 18 transfers image files in response to the request from the PC 42 (corresponds to (5)~(8) in FIG. 3) and then the operation proceeds to step S45.

In step S45, the main CPU 18 makes a decision as to whether or not there is any management information yet to be registered. The main CPU 18 makes an affirmative decision in step S45 if there is an image file the management information of which has not yet been registered (i.e., if the quantity of image files recorded in the recording medium 30 exceeds A) and, in this case, the operation returns to step S43. In step S43, the handle management table is initialized (the register contents are cleared) and then the management information for the (A+1)th image file and beyond, which has not yet been registered, is written into the handle management table, before the operation proceeds to step S44.

The main CPU 18, however, makes a negative decision in step S45 if there is no image file the management information for which is yet to be registered (i.e., if the management information for all the image files in the recording medium 30 has already been registered). In this case, the main CPU 18 ends the processing in FIG. 4 upon receiving a transfer complete notification from the PC 42.

Transfer Through Shoot & Transfer Method

Figure 2:
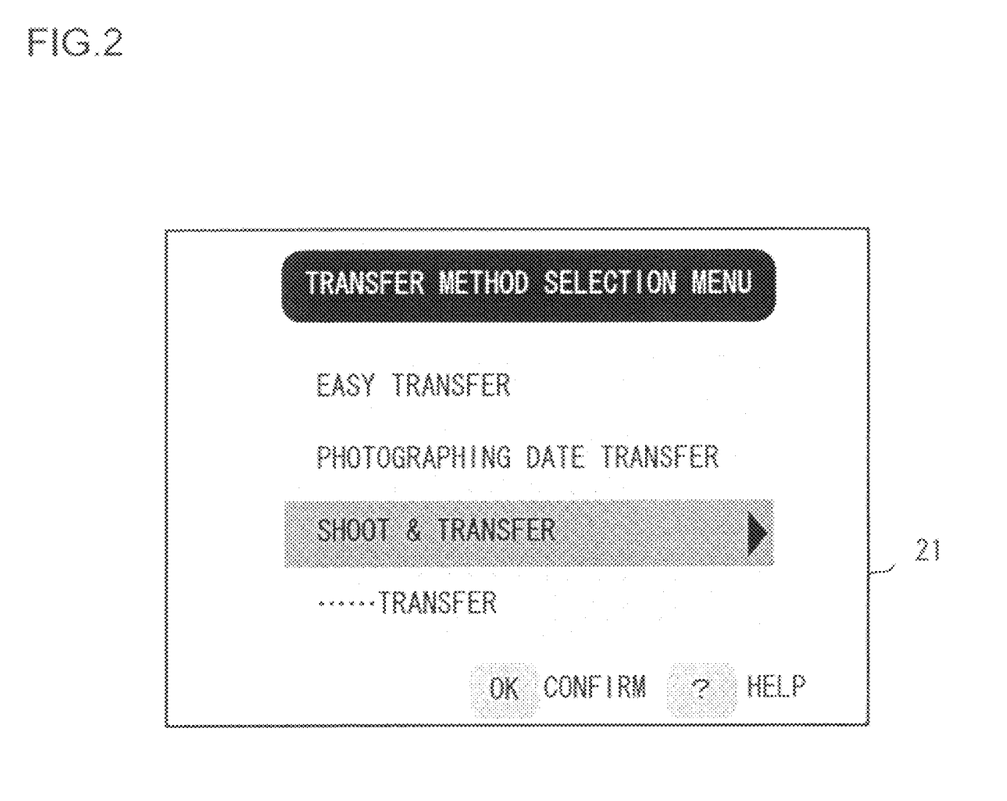

The electronic camera 1 selects the shoot & transfer method in response to an operation signal from the operation member 22 indicating "shoot & transfer" while a menu screen such as that shown in FIG. 2 is on display at the liquid crystal monitor 21.

In the "shoot & transfer" method, the electronic camera 1 transfers an image file containing a photographic image captured by the electronic camera 1 to the PC 42. In the "shoot & transfer" method, the electronic camera 1 issues a notification to the PC 42 after each photographing operation and, in response to the notification, the PC 42 issues a request that the electronic camera 1 transfer the photographic image file.

It is to be noted that the user may be allowed to select through a menu operation either of two transfer method options, i.e., a transfer method whereby the image file containing a photographic image is transferred to the PC 42 immediately after each photographing operation and a transfer method whereby a verification message inquiring whether or not to transmit the image file to the PC 42 is brought up on display at the liquid crystal monitor 21 after each photographing operation and the image file is transferred to the PC 42 only if a transfer instruction is issued. In addition, following the photographing operation, the user may be allowed to indicate through a menu operation as to whether or not to save the image file containing the photographic image into the recording medium 30. The following description is provided by assuming that the image file containing a photographic image is immediately transferred to the PC 42 and the photographic image file is always saved into the recording medium 30.

Figure 5:
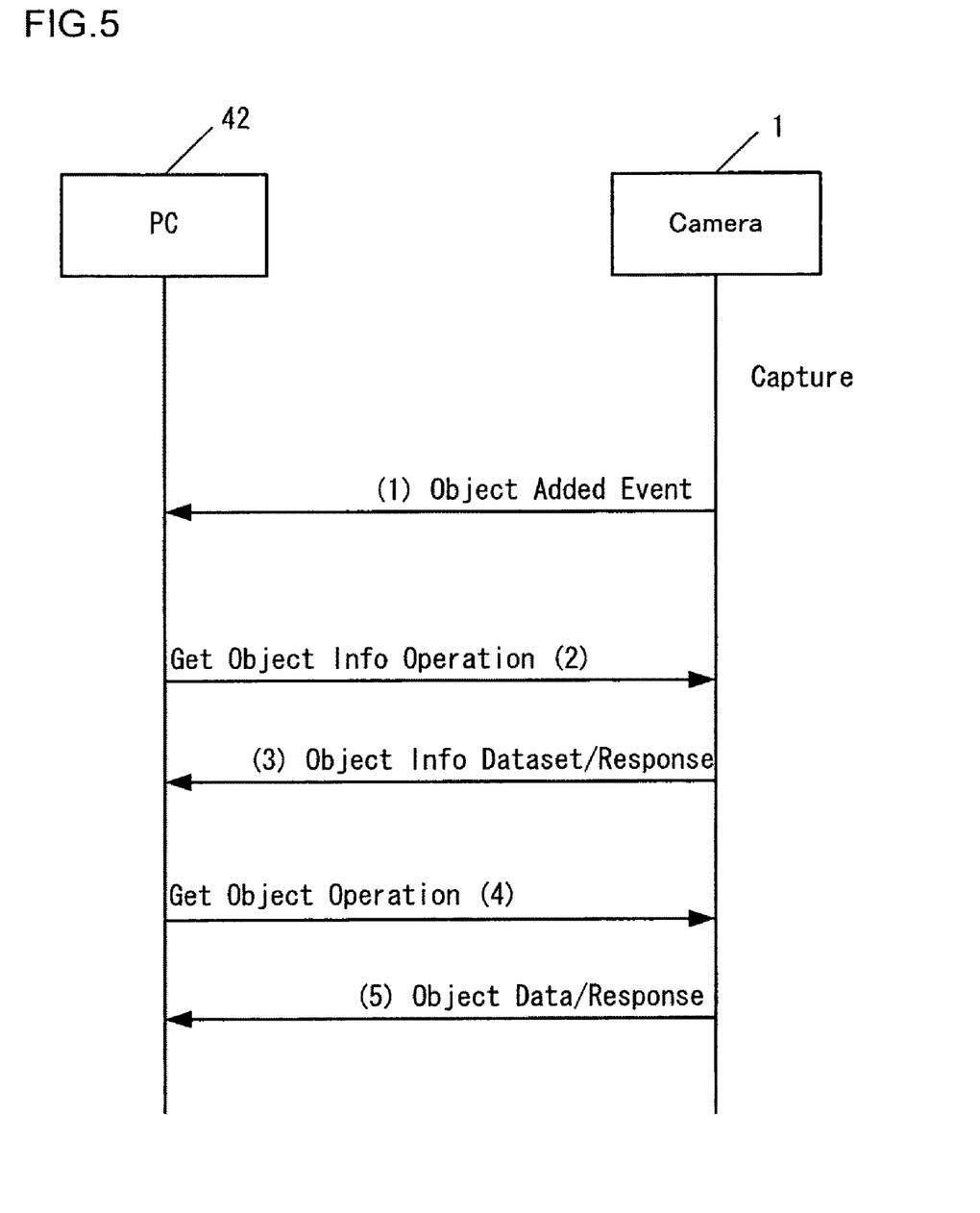

FIG. 5 presents an example of a processing sequence that may be executed to transfer image files from the electronic camera 1 to the PC 42 through the "shoot & transfer" method. As the "shoot & transfer" method is selected, the electronic camera 1 brings up on display a photograph screen at the liquid crystal monitor 21. A monitor image (so called a live image or a through image) is displayed in the photograph screen before a photographing instruction is issued (before a full press operation signal is output from the shutter button), whereas a photographic image (freeze frame image) is displayed in the photograph screen over a predetermined length of time after the photographing instruction is issued.

Once the photographing operation has been executed, the electronic camera 1 records the photographic image file into the recording medium 30 and transmits to the PC 42 an Object Added Event command (1), to notify the PC 42 that a photographing operation has been executed. Upon receiving the notification, the PC 42 transmits to the electronic camera 1 a Get Object Info Operation command (2), requesting that the electronic camera 1 transmits information related to the image file containing the photographic image. Upon receiving the request, the electronic camera 1 transmits the information related to the photographic image file to the PC 42 in conformance to an Object Info Dataset/Response command (3).

Upon receiving the photographic image file information, the PC 42 transmits to the electronic camera 1 a Get Object Operation command (4) requesting that the electronic camera 1 transmits the image file. Upon receiving the request, the electronic camera 1 returns a response accompanied by the photographic image file, to the PC 42 in conformance to an Object Data/Response command (5). Through the processing sequence described above, an image file containing a photographic image is transferred following each photographing operation from the electronic camera 1 to the PC 42.

Figure 6:
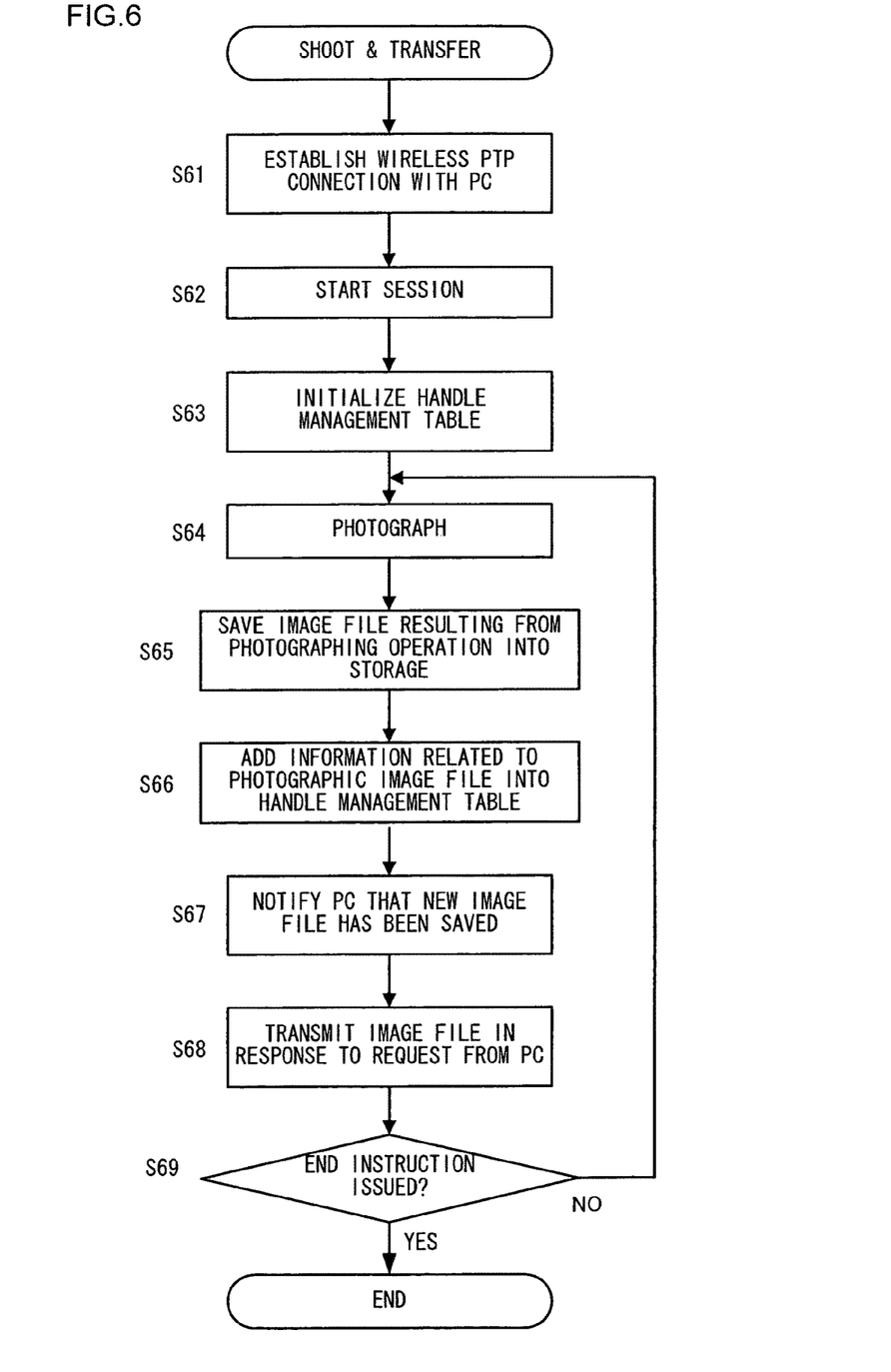

In reference to the flowchart presented in FIG. 6, the flow of transfer processing executed by the main CPU 18 in the electronic camera 1 during the processing sequence, an example of which is presented in FIG. 5, is described. The program based upon which the processing in FIG. 6 is executed is started up as an operation signal indicating "shoot & transfer" is input from the operation member 22 to the main CPU 18. In step S61 in FIG. 6, the main CPU establishes a wireless PTP connection with the PC 42 and then the operation proceeds to step S62.

In step S62, the main CPU 18 starts a session before the operation proceeds to step S63. In step S63, the main CPU 18 initializes the handle management table (clears the register contents) before the operation proceeds to step S64.

In the "shoot & transfer" mode, the main CPU 18 does not write the information indicating the image files already recorded in the recording medium 30 into the handle management table. In other words, no information is registered in the handle management table at this point.

In step S64, the main CPU 18 executes a photographing operation in response to a photographing instruction and then the operation proceeds to step S65. In step S65, the main CPU 18 records the image file containing the photographic image obtained through the photographic operation into the recording medium 30 and then the operation proceeds to step S66.

In step S66, the main CPU 18 adds into the handle management table the information indicating the image file resulting from the photographing operation and newly recorded into the recording medium 30, and then the operation proceeds to step S67. In step S67, the main CPU 18 transmits the Object Added Event command to the PC 42, notifying the PC 42 that a photographing operation has been executed (i.e., a new image file has been saved into the recording medium 30 (corresponds to (1) in FIG. 5)). In addition, in response to the request from the PC 42, the main CPU 18 transmits the information related to the image file containing the photographic image, i.e., the information registered in the handle management table, to the PC 42 (corresponds to (2) and (3) in FIG. 5), before the operation proceeds to step S68.

In step S68, the main CPU 18 reads out the image file from the recording medium 30 and transfers the image file to the PC 42 in response to the request from the PC 42 (corresponds to (4) and (5) in FIG. 5) and then the operation proceeds to step S69. It is to be noted that if the particular image file is present in the buffer memory 19, the image file may be transferred from the buffer memory 19 directly to the PC 42 without accessing the recording medium 30. In step S69, the main CPU 18 makes a decision as to whether or not a "shoot & transfer" mode end instruction has been issued. The main CPU 18 makes an affirmative decision in step S69 if an operation signal indicating a transfer end has been output from the operation member 22 and ends the processing in FIG. 6. If, on the other hand, no operation signal indicating a transfer end is output from the operation member 22, the main CPU 18 makes a negative decision in step S69 and the operation returns to step S64.

The following advantages are achieved through the embodiment described above.

(1) If the "shoot & transfer" mode is selected as the PTP image file transfer method, information indicating an image file containing a newly photographic image and newly recorded in the recording medium 30 alone is registered in the handle management table without registering any information indicating image files already recorded in the recording medium 30 into the handle management table. In the "shoot & transfer" mode in which the list information listing the image files already recorded in the recording medium 30 is not transmitted to the PC 42, the length of time to elapse before the transfer start can be reduced by skipping the registration of the information indicating previously recorded image files. This feature will prove particularly advantageous when there are a large number of images (e.g., 10,000 frames or more) recorded in the recording medium.

(2) If the "easy transfer" mode is selected as the PTP image file transfer method, the information indicating all the image files recorded in the recording medium 30 is registered into the handle management table and, based upon the registered information, the list information listing the image files recorded in the recording medium 30 can be promptly transmitted to the PC 42.

(3) If the volume of the information to be registered in the "easy transfer" mode (see (2) above), exceeds the recording capacity of the memory area allocated for the handle management table, information indicating A image files that can be registered at once is initially registered into the handle management table, so as to transfer a group of image files corresponding to the registered information first. Once the initial group of image files has been transferred, the information indicating the (A+1) th image file and beyond is registered into the handle management table so as to transfer the next group of image files corresponding to the registered information. Thus, image files can be transferred in the "easy transfer" mode by registering the management information into the handle management table in a plurality of installments without having to increase the recording capacity of the memory area allocated for the handle management table even if a next-generation recording medium 30 with a greater recording capacity having a very large quantity of photographic images recorded therein is loaded into the electronic camera.

(Variation 1)

The processing in the flowchart presented in FIG. 4 can be executed when transferring photographic images satisfying a specific condition. For instance, in the "photographing data transfer" mode, image files having been created on a specified photographing date, among the image files recorded in the storage (the recording medium 30 in this example) in the electronic camera 1, are selectively transferred to the PC 42. In this mode, the image files satisfying the condition are all transferred to the PC 42, regardless of whether or not there is any image file created on the specified photographing date already saved at the PC 42. In the "photographing date transfer" mode, the electronic camera 1 creates list information listing the image files created on the specified photographing date and transmits the list information to the PC 42 before starting the image file transfer. The PC 42, in turn, issues a request to the electronic camera 1 that the image files listed in the list information be transmitted.

The contents of the information registered into the handle management table in the "photographing date transfer" mode differs from the contents of the information registered into the handle management table in the "easy transfer" mode as follows. Namely, in the "photographing date transfer" mode, the main CPU 18 registers information indicating the image files created on the specified photographing date, among the image files recorded in the storage (the recording medium 30 in this example) loaded in the electronic camera 1, into the handle management table.

However, the registration processing executed in the "photographing date transfer" mode is similar to that executed in the "easy transfer" mode in that if the data volume of the management information to be registered indicating all the image files created on the specified photographing date, exceeds the recording capacity of the area allocated for the handle management table, only the management information for A image files that can be registered at once is written into the handle management table before the operation proceeds to step S44 and that the excess management information, i.e., the management information for the (A+1)th image file and beyond, that has not been registered initially is written into the handle management table when the operation returns to step S43 after making an affirmative decision in step S45.

In the "photographing date transfer" mode, the specific photographing date is indicated to the electronic camera 1 in an operation signal output from the operation member 22. In more specific terms, the electronic camera 1 brings up on display at the liquid crystal monitor 21, a list of photographing dates on which image files recorded in the recording medium 30 were created. The electronic camera 1 designates a photographing date selected based upon the operation signal output from the operation member 22, among the photographing dates listed on display, as the specified photographing date.

(Variation 2)

While the handle management table is first initialized before the management information is registered in the description given above, the register contents do not need to be cleared. Instead, the management information may be registered by writing it over the existing registered information.

The embodiment described above simply represents an example and the present invention is in no way limited to this structure. It will be understood by those skilled in the art that various changes in form and detail may be made therein without departing from the scope and teaching of the invention.

The disclosure of the following priority application is herein incorporated by reference: Japanese Patent Application No. 2006-226597 filed Aug. 23, 2006

The invention claimed is:

1. An electronic camera, comprising:
   a communication unit engaged in communication with an external device;
   a selection unit that selects a transfer method of a photographic image among a plurality of transfer methods;
   a transfer control unit that controls the communication unit so as to start, in response to a command transmission from the communication unit to the external device, a transfer of the photographic image from the communication unit to the external device through the transfer method selected by the selection unit;
   a registration unit where management information related to the photographic image to be transferred is registered, the management information being used when transferring the photographic image; and
   a registration control unit that varies a registration method with which the management information is registered in the registration unit in correspondence to the transfer method selected by the selection unit, wherein
   the transfer control unit controls the communication unit so as to transfer photographic images corresponding to the management information having been registered in the registration unit.

2. An electronic camera according to claim 1, wherein:
   if a transfer method whereby photographic images that have not been previously transferred are transferred to the external device, is selected by the selection unit, the registration control unit records management information related to all photographic images recorded in a recording medium loaded in the electronic camera into the registration unit.

3. An electronic camera according to claim 2, wherein:
   if a volume of management information to be registered exceeds a volume of management information that can be registered at once in the registration unit, the registration control unit registers the management information to be registered into the registration unit in a plurality of installments.

4. An electronic camera according to claim 3, wherein:
   after the photographic images corresponding to the management information initially registered in the registration unit are transferred, the registration control unit registers management information that has not yet been registered into the registration unit.

5. An electronic camera according to claim 1, wherein:
   if a transfer method whereby photographic images satisfying a specific condition are transferred is selected by the selection unit, the registration control unit registers management information related to photographic images satisfying the specific condition among photographic images recorded in a recording medium loaded in the electronic camera, into the registration unit.

6. An electronic camera according to claim 5, wherein:
   if a volume of management information to be registered exceeds a volume of management information that can be registered at once in the registration unit, the registration control unit registers the management information to be registered into the registration unit in a plurality of installments.

7. An electronic camera according to claim 6, wherein:
   the transfer control unit controls the communication unit so as to transfer photographic images corresponding to the management information having been registered in the registration unit; and
   after the photographic images corresponding to the management information initially registered in the registration unit are transferred, the registration control unit registers management information that has not yet been registered into the registration unit.

8. An electronic camera according to claim 1, wherein:
   if a transfer method whereby a photographic image resulting from a photographing operation is transferred after each photographing operation is selected by the selection unit, the registration control unit does not register management information related to photographic images already recorded in a recording medium loaded in the electronic camera into the registration unit; and
   each time a newly photographic image is recorded into the recording medium, the registration control unit additionally registers management information related to the newly photographic image into the registration unit.

9. An electronic camera according to claim 8, wherein:
   the transfer control unit controls the communication unit so as to transfer a photographic image corresponding to the management information having been additionally registered into the registration unit.

10. An electronic camera according to claim 1, wherein:
    if a transfer method whereby photographic images that have not previously been transferred are transferred to the external device is selected by the selection unit, the registration control unit registers management information related to all photographic images recorded in a recording medium loaded in the electronic camera into the registration unit; and
    if a transfer method whereby a photographic image resulting from a photographing operation is transferred following each photographing operation is selected by the selection unit, the registration control unit additionally registers management information related to a newly photographic image into the registration unit each time the newly photographic image is recorded into the recording medium, without registering management information related to photographic images already recorded in the recording medium loaded in the electronic camera.

11. An electronic camera according to claim 1, wherein:
the transfer control unit transmits to the external device management information related to a photographic image having been registered in the registration unit and executes control so as to transfer the photographic image in response to a request issued from the external device based upon the management information related to the photographic image, which has been registered in the registration unit and transmitted to the external device.

12. An image transfer method adopted in an electronic camera, comprising:
selecting a transfer method, among a plurality of transfer methods, through which a photographic image is to be transferred to an external device;
registering management information related to the photographic image into a predetermined storage area through a method varying in correspondence to the selected transfer method;
transmitting the management information related to the photographic image, having been registered into the predetermined storage area, to the external device; the management information being used when transferring the photographic image; and
transferring the photographic image to the external device in response to a request issued from the external device based upon the management information related to the photographic image having been transmitted to the external device.

13. An image transfer method adopted in an electronic camera according to claim 12, wherein:
the photographic image is recorded into a recording medium loaded into the electronic camera;
if a first transfer method is selected, management information related to all images recorded in the recording medium is registered into the predetermined storage area; and
if a second transfer method different from the first transfer method is selected, management information related to an image newly recorded into the recording medium is registered into the predetermined storage area without registering the management information related to the images already recorded in the recording medium into the predetermined storage area.

14. An electronic camera, comprising:
a communication unit engaged in communication with an external device;
a selection unit that selects one of a first transfer method and a second transfer method to transfer a photographic image;
a transfer control unit that controls the communication unit so as to start, in response to a command transmission from the communication unit to the external device, a transfer of the photographic image from the communication unit to the external device through the one of the first transfer method and the second transfer method selected by the selection unit;
a registration unit where management information related to the photographic image to be transferred is registered, the management information being used when transferring the photographic image; and
a registration control unit that uses a first registration method to register management information in the registration unit when the first transfer method has been selected and uses a second registration method to register the management information into the registration unit when the second transfer method has been selected, the first registration method and the second registration method being different from each other, wherein
the first transfer method is a transfer method whereby photographic images that have not previously been transferred are transferred to the external device;
the second transfer method is a transfer method whereby a photographic image resulting from a photographing operation is transferred following each photographing operation;
if the first transfer method is selected by the selection unit, the registration control unit registers management information related to all photographic images recorded in a recording medium loaded in the electronic camera into the registration unit in the first registration method;
if the second transfer method is selected by the selection unit, the registration control unit additionally registers management information related to a newly photographic image into the registration unit each time the newly photographic image is recorded into the recording medium, without registering management information related to photographic images already recorded in the recording medium loaded in the electronic camera in the second registration method; and
the transfer control unit controls the communication unit so as to transfer photographic images corresponding to management information having been registered in the registration unit.

15. An electronic camera according to claim 14, wherein:
the selection unit selects one of the first transfer method, the second transfer method and further a third transfer method to transfer a photographic image;
the transfer control unit controls the communication unit so as to start the transfer of the photographic image from the communication unit to the external device through the one of the first transfer method, the second transfer method and the third transfer method selected by the selection unit;
the registration control unit uses a third registration method to register management information in the registration unit when the third transfer method has been selected, the third registration method being different from the first registration method and the second registration method;
the third transfer method is a transfer method whereby photographic images satisfying a specific condition are transferred;
if the third transfer method is selected by the selection unit, the registration control unit registers management information related to photographic images satisfying the specific condition among photographic images recorded in a recording medium loaded in the electronic camera, into the registration unit in the third registration method.

* * * * *